4437

REISSUED JUN 27 1871

Witnesses:
Joel Tiffany
O. Macdaniel

Inventor:
E. D. Brainerd

UNITED STATES PATENT OFFICE.

EDWIN D. BRAINARD, OF ALBANY, NEW YORK.

IMPROVEMENT IN THE CONSTRUCTION OF ICE-CHAMBERS, REFRIGERATING-CHAMBERS, &C.

Specification forming part of Letters Patent No. 73,292, dated January 14, 1868; reissue No. 4,437, dated June 27, 1871.

DIVISION B.

*To all whom it may concern:*

Be it known that I, EDWIN D. BRAINARD, of the city and county of Albany and State of New York, have invented a new and useful Improvement in the Structure of Ice-Chambers, Refrigerating-Chambers, Fermenting-Chambers, and all other chambers and inclosures requiring for use a low temperature and dry atmosphere, when combined with an ice-chamber, forming an improved system of refrigeration and desiccation for purposes of preserving vegetable, animal, and other substances, and for fermenting and other purposes.

In the structure of ice and other chambers constituting my system of desiccation and refrigeration for the above purposes I employ metallic corrugations or inclines to form the ceiling of such chambers, whether used for storing ice or other purposes, as refrigeration, desiccation, fermenting, &c., requiring a low temperature and dry atmosphere, to be used for condensing upon the inclined or corrugated under surfaces the moisture contained in the atmosphere and rising to such surfaces, and employing, in connection with such inclined surfaces, gutters or drip-troughs to receive and convey away the drip from such ceilings and discharge it outside the chamber in which my ceiling is employed.

Figure 1:
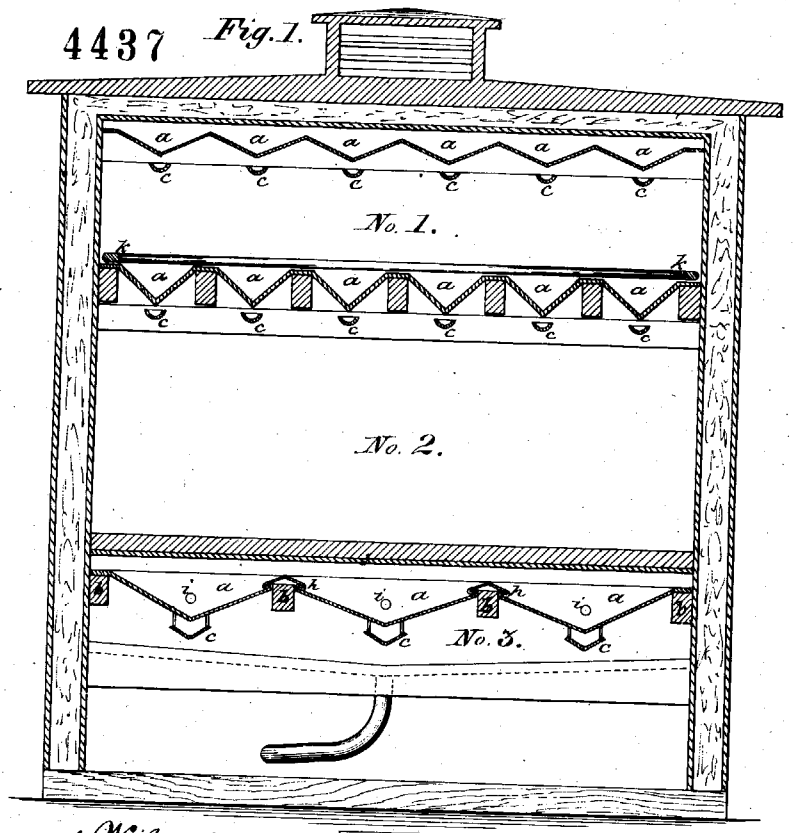

According to my system of desiccation and refrigeration I construct my ice-chamber at the top of the building, or in the upper story, as shown in Figure 1 of the accompanying drawing, in which figure No. 1 represents the ice-chamber and Nos. 2 and 3 represent the refrigerating and other chambers employed as a part of my system. These chambers are inclosed by double walls, having dead-air spaces or chambers between them, to be packed with shavings, cut straw, or other similar light material, making such walls and spaces non-conductors of heat from the outside atmosphere to such chambers. There is likewise to be a thick packing above the ceiling of the ice-chamber of two or three feet of shavings, cut straw, or other similar material, to prevent the ingress of heat through the ceiling into the ice-chamber. This packing lies directly on the ceiling, and forms a protection against the conduction or radiation of heat through the ceiling. In the construction of the ceiling of my ice-chamber I use these metallic corrugations or inclines with these corresponding drip-gutters for the purpose of producing a dry atmosphere and low temperature in the ice-chamber, so as to preserve the ice in such dry atmosphere, and keep such atmosphere at the top of the building in a condition fit to be used in any of the lower chambers whenever and for whatever purposes such dry atmosphere and low temperature may be needed. The office of these ceilings is to produce the dry atmosphere, and the office of the ice to produce a low temperature. In the construction of the ice-chamber it is desirable to expose as large a surface of the ice to the atmosphere as possible, both for the purpose of preserving the ice and for keeping the atmosphere of the chamber at a low temperature. The atmosphere itself is the best non-conductor of caloric. It is, therefore, desirable to dispense as far as possible with all ice-floors or solid surfaces upon which to place the ice. I, therefore, in the structure of my ice-chamber, employ no floor, using instead thereof wooden slats, forming an open rack, upon which the ice rests. I use wood for the slats because it is a better non-conductor, and has less tendency to melt away or consume the ice. These slats rest directly upon the floor-beams, to which and between which are attached my metallic corrugations or inclines, forming the ceiling of the chamber below. This method of construction gives a large air-space between the metallic ceilings and the bottom of the ice in the ice-chamber resting upon the open rack above described, which air-space prevents a large per cent. of the heat or caloric arising to the ceiling below from coming in contact with and melting the ice in the ice-chamber. In this way there is great economy in preserving the ice, over and above the method of employing metallic and other ice-floors which communicate immediately with the ice itself. In an ice-chamber thus constructed the atmosphere is always dry and stands at a temperature of 34° Fahrenheit, in which ice will remain indefinitely. When the ice rests directly upon a metallic ice-floor, which floor forms the ceiling of the chamber immediately beneath, the temperature of the lower chamber, when freed from the influence of surrounding temperatures—that is, when insulated from all external influences except from the ceiling on which the ice rests—will stand about 34° Fahrenheit, the same as the ice-chamber. This temperature in the refrigerating-chamber is much too low for most purposes for which a refrigerating or fermenting-chamber is employed, and can only be increased at the direct and immediate expenditure of ice; whereas, when constructed according to my plan, leaving a large space between the ceiling below and the ice, the temperature of the room below naturally stands at 40° Fahrenheit, a temperature much better adapted to the preservation of vegetable substances, and equally as good for the preservation of animal substances for the length of time desirable, than the temperature of 34° Fahrenheit. For purposes of fermentation, as used by brewers, so low a temperature as 34° cannot be used, and even 40° is not high enough; but the heat arising from fermentation soon raises the temperature of the fermenting-room to 46°, or higher, to be regulated by the introduction of the colder atmosphere of the ice-chamber. Those using the metallic ice-floor as a ceiling for the fermenting-chamber find it necessary to employ other means of raising the temperature of the fermenting-room to the necessary standard for fermenting, which is done at the expense of the ice, using from forty to sixty per cent. more ice to do the same work than is necessary when no metallic ice-floor is used and when the chambers are constructed according to my improvement.

In the employment of my improved system of refrigerating and desiccation it is necessary that each chamber shall have attached my improved corrugated or inclined metallic ceilings, with suitable drip-troughs or gutters for receiving and conveying away the drip from the ceiling.

In my ice-chamber I provide for a vacant space between the ice and the outer walls of the chamber. I do this by means of studs or posts set up at suitable distances, forming an ice-rack all round the ice-chamber, keeping the ice from the walls of the chamber.

The essential principle of refrigerating for the purpose of preserving vegetable, animal, and other substances requires that the atmosphere shall be freed from its moisture at whatever temperature it is required to be used; and by the employment of my corrugated or inclined metallic ceilings, as above described, whenever the temperature of the chamber is increased by bringing other substances into the chamber an upward current is created, carrying the vapor or moisture contained in the air to the ceiling, when it is deposited by condensation upon its inclined surfaces, and the atmosphere, thus freed from its moisture and heat, becomes heavier and descends, forcing up again the warmer air to the ceiling, to pass through the same process above described.

I place my ice-chamber at the top of the building to avail myself of the principle that cold air, being heavier than warm air, will descend of its own gravity to the lower chambers whenever an opening is made between the chambers. Such openings or communications between the chambers are easily regulated by means of damper-ways placed between the ice-chamber and the rooms below it.

These modes of communicating between chamber or rooms of different temperatures are not new, and do not, in principle, differ from modes in common use for regulating the temperatures of different rooms in ordinary buildings, where systems of heating by furnaces are used. The interposition of pipes, flues, damper-ways, and dampers between the furnaces and the rooms to be heated is well known and understood. By my system of refrigerating the ice-chamber takes the place of the furnace, and cold air is employed in the place of warm air to cool instead of heat the rooms; consequently, the same modes of communication between the several chambers embraced in my system may be employed which are used in the system of heating, being careful to arrange for the passage of the cold currents downward, when, in heating, the currents pass upward.

My improvements in the system of refrigeration above described are intended to embrace any and all the known means or methods of interchange of temperature between different rooms or chambers employing my improved apparatus for refrigeration or desiccation, as above described, using dampers, valves, or any means by which such interchange of temperature may be renewed or suspended at pleasure.

Figure 2:
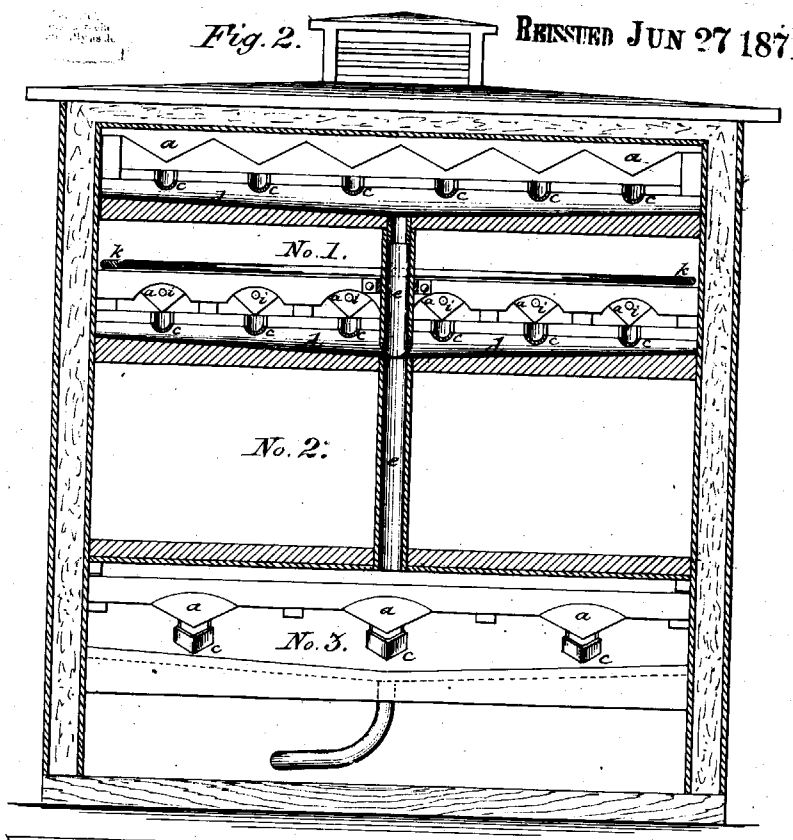
Figure 3:
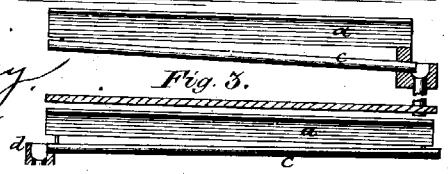
Figure 4:
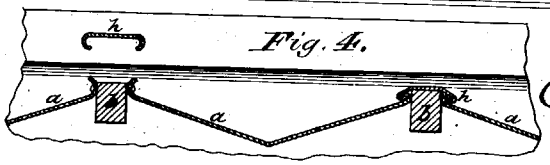

The manner of applying my improved apparatus as ceilings to these chambers is fully represented in Figs. 1 and 2 of the accompanying drawing. In Fig. 1 the condensing-troughs or metallic inclines are seen at *a a a a a a a*, with their corresponding drip-gutters at *c c c c c c*. The manner of attaching these corrugations to the joists is represented in Fig. 4 of the accompanying drawing.

These drip-gutters are made of wood and lined inside with galvanized iron. This is to avoid the condensation of water upon the under side of the drip-troughs.

Having thus explained, my system of refrigeration and desiccation as applied to a series of chambers constructed each according to my improvement and connected together for purposes of practical operation, I will state my claim.

I claim—

The combination of a chamber or chambers with an ice-chamber, each having attached my improved ceiling, operating substantially as described.

EDWIN D. BRAINARD.

Witnesses:
JOEL TIFFANY,
O. MACDANIEL.